Sept. 14, 1965 G. D. NORMAN 3,206,115

CIRCULAR SLIDE RULE

Filed Sept. 26, 1962

INVENTOR.
GEORGE D. NORMAN
BY
Robertson & Smythe
ATTORNEYS

United States Patent Office 3,206,115
Patented Sept. 14, 1965

3,206,115
CIRCULAR SLIDE RULE
George D. Norman, East Moline, Ill., assignor to Ametek, Inc., New York, N.Y., a corporation of Delaware
Filed Sept. 26, 1962, Ser. No. 226,353
2 Claims. (Cl. 235—84)

The present invention relates to calculating devices and particularly to a new and improved slide rule for use with fatigue testing equipment in the calculation of forces to be applied in fatigue testing of materials.

In fatigue testing it is often the practice to maintain a level of constant stess in the specimen and to apply an additional alternating stress. Fatigue testing procedures may require that various steady stress levels as well as various ranges of alternating stress be applied to a specimen.

The principal object of the invention is to provide a slide rule for readily determining the values of the oscillating forces and the counterpressure force (compatible with operating conditions for a double acting, hydraulically actuated machine) to produce the oscillating or alternating stress conditions required on the part to be tested.

Another object of the invention is to provide such a slide rule in which the maximum stress is readily determined.

Still another object of the invention is to provide such a slide rule in which the value of prestress can easily be found that will permit applying to a specimen alternating increasing and decreasing stresses of a predetermined value while still maintaining a predetermined minimum stress in the specimen.

Still another object of the invention is to provide such a slide rule in which the value for the minimum stress may be easily varied.

In one aspect of the invention, a slide rule may be produced by employing a stationary disc having equidistant indicia of increasing value on opposite sides of a median point.

In another aspect of the invention, a rotatable disc may be journaled on a pin or the like at the center of the circle on the stationary disc about which the above-referred-to indicia are located. The rotatable disc may include a circular arrangement of indicia of increments equal to those on the stationary disc but increasing in value from zero in a counterclockwise direction.

In still another aspect of the invention, an arm may be mounted for pivotal movement about the center of rotation of the rotatable disc, and it may include two pointers spaced apart an amount equal to the value of the minimum force to be applied to the specimen.

In still another aspect of the invention, the spaced pointers on the pivotal arm may be adjustable.

The above, other objects and novel features of the slide rule will become apparent from the following specification and accompanying drawing which is merely exemplary.

Figure 1:
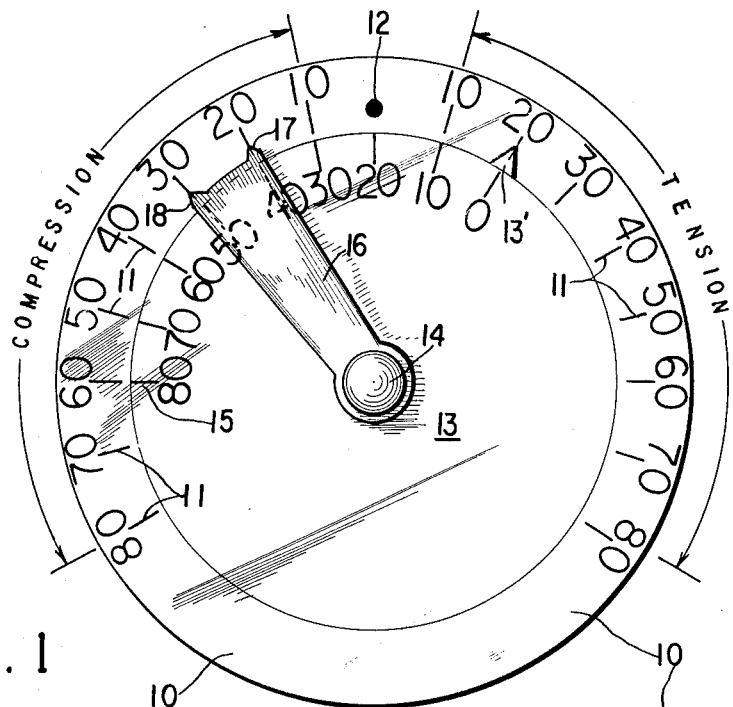
Figure 2:
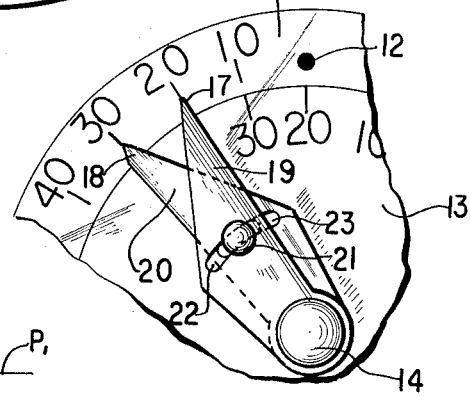
Figure 3:
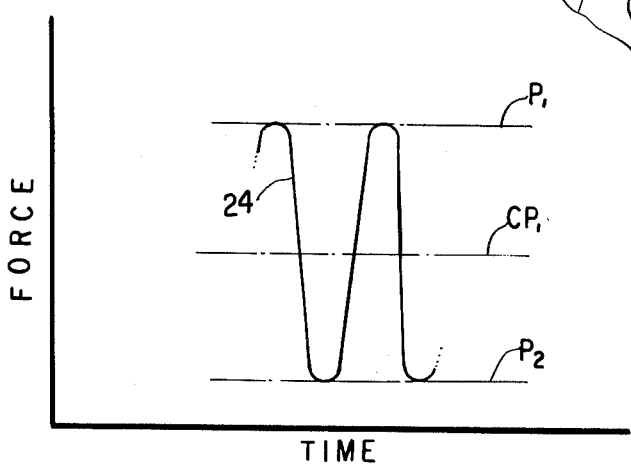

In the drawing:
FIG. 1 is a plan view of a slide rule to which the principles of the invention have been applied;
FIG. 2 is a modified form of the invention shown in FIG. 1; and
FIG. 3 is a curve illustrating the cyclic pattern of applied force to a specimen.

Referring to the drawing, the principles of the invention are shown as applied to a slide rule including a stationary disc 10 having indicia 11 laid out equidistantly along an arc on either side of a datum 12. This datum may be a motion limiting pin extending from the surface of the device. The indicia represent units such as percentage of static capacity of the particular machine with which the device is to be used.

A disc 13 may be mounted on a pin 14 at the center of the arc of the indicia 11, for rotation. The disc 13 may include indicia 15 laid out equidistantly along its periphery in increasing values from zero in a counterclockwise direction. A pointer 13' may be attached to disc 13 at the zero point for cooperation with datum pin 12 to prevent the rotation of disc 13 counterclockwise beyond datum pin 12. The spacing of the indicia 11 and 15 may be equal, and the indicia 15 may be units such as percentage of static capacity which can be related to the peak force and the counterpressure.

An arm 16 may be pivoted on the pin 14 and it may include two pointers 17 and 18 spaced apart a predetermined amount such as percentage of the minimum pressure below which the alternating pressure does not fall. The pointer 17 is adapted to cooperate with pin 12 to prevent its movement in a clockwise direction beyond pin 12.

Assume, for example, that it is desired to apply an alternating pressure of 20% of static capacity to a specimen about a central point and that the pointers 17, 18 are separated an amount equal to 10% of the pressure, the latter representing the minimum pressure to be applied to the specimen; in other words, the minimum force to be applied by one side of the force applying system. If the zero of disc 13 is placed beneath the 20-unit value on the righthand side of datum 12 of stationary disc 10, and if arm 16 is turned until pointer 17 is in line with the 20-unit value on the lefthand side of the datum 12, the pointer 18 will indicate that the counterforce, or force to be applied to the specimen, is 30% as read on the disc 10. The lefthand side of arm 16 indicates that the maximum force applied for the given data is 50%, on the disc 13.

Referring to FIG. 2, the arm pivoted at 14 is shown as comprising two elements 19 and 20 adjustably held in predetermined, spaced relation by a set screw 21 extending through arcuate slots 22, 23 in elements 19 and 20 and in radial alignment. This construction permits varying the spacing of the pointers 17 and 18 to accommodate different minimum values of force. The pin 12 will act as a stop so that pointer 13' on disc 13 cannot be rotated counterclockwise beyond zero and will prevent pointer 16 from moving clockwise beyond zero.

Referring to FIG. 3, a sinusoidal curve 24 is shown representing the magnitude and relative frequency of the alternating force applied to the specimen. The value $P_2$ is the value of the minimum force or pressure; the value $P_1$ the maximum force or pressure; and the value $CP_1$ is the counterforce or counterpressure.

An example of a machine in conjunction with which the device can be used is seen in U.S. Patent No. 3,083,566.

Although the various features of the new and improved slide rule have been shown and described in detail to fully disclose two embodiments of the invention, it will be evident that changes may be made in such details and certain features may be used without others without departing from the principles of the invention.

What is claimed is:
1. A calculating device for use in fatigue testing of specimens to calculate tension, compression and prestress loadings in setting machine, the combination including a stationary disc having a datum pin extending from the face thereof, adjacent the periphery of said disc, said disc having equidistant tension and compression indicia increasing in numerical value on each side of said datum pin; a rotatable disc of smaller diameter than said stationary disc mounted on said stationary disc and having a pointer projecting from the periphery thereof, said pointer cooperating with said datum pin so that it will prevent rotation of said rotatable disc in a counterclockwise direction past said datum pin, said pointer cooperating with the indicia on said stationary disc so as to be set to the selected tension loading value; equidistant indicia increasing in numerical value in a counterclockwise direction from zero on said rotatable disc; an arm pivotally mounted on said stationary disc; and pointers on said arm spaced the predetermined distance apart of the minimum load to be applied and adapted to cooperate with the indicia on said stationary disc, the left hand edge of said arm being adapted to cooperate with the indicia on said rotatable disc to indicate the mean loading, the right hand edge of said arm being settable in cooperation with indicia on said stationary disc to give the compression loading in relation to the mean loading, the right hand edge of said pointer also preventing rotation thereof in a clockwise direction beyond said datum pin.

2. A calculating device for use in fatigue testing of specimens to caculate tension, compression and prestress loadings in setting machine, the combination including a stationary disc having a datum pin extending from the face thereof, adjacent the periphery of said disc, said disc having equidistant tension and compression indicia increasing in numerical value on each side of said datum pin; a rotatable disc of smaller diameter than said stationary disc mounted on said stationary disc and having a pointer projecting from the periphery thereof, said pointer cooperating with said datum pin so that it will prevent rotation of said rotatable disc in a counterclockwise direction past said datum pin, said pointer cooperating with the indicia on said stationary disc so as to be set to the selected tension loading value; equidistant indicia increasing in numerical value in a counterclockwise direction from zero on said rotatable disc; and arm means pivotally mounted on said stationary disc, said arm means comprising pointers adjustably spaced the preselected distance apart of the minimum load to be applied and adapted to cooperate with the indicia on said stationary disc, the left hand edge of said arm being adapted to cooperate with the indicia on said rotatable disc to indicate the mean loading, the right hand edge of said arm being settable in cooperation with indicia on said stationary disc to give the compression loading in relation to the mean loading; the right hand edge of said pointer also preventing rotation thereof in a clockwise direction beyond said datum pin.

References Cited by the Examiner

UNITED STATES PATENTS

| | | | |
|---|---|---|---|
| 99,902 | 2/70 | Hulbert et al. | 58—43 |
| 877,314 | 1/08 | Fee | 73—396 |
| 1,404,019 | 1/22 | Gilson | 235—84 |
| 2,169,956 | 8/39 | Leatart | 58—43 |
| 2,725,194 | 11/55 | Krauss | 235—84 |
| 2,995,106 | 8/61 | Granada | 111—136.5 |
| 3,044,698 | 7/62 | Maluf | 235—88 |
| 3,069,080 | 12/62 | Uchihara | 235—64.7 |

FOREIGN PATENTS 828,161  1/52  Germany.

LEO SMILOW, *Primary Examiner.*